United States Patent [19]
Vingas

[11] 3,734,569
[45] May 22, 1973

[54] PNEUMATIC CONVEYING SYSTEM AND APPARATUS

[75] Inventor: George J. Vingas, Mundelein, Ill.

[73] Assignee: Pneu-Veyor, Inc., Lincolnwood, Ill.

[22] Filed: Nov. 3, 1971

[21] Appl. No.: 195,116

[52] U.S. Cl. ..................................302/39, 302/62
[51] Int. Cl. ..............................................B65g 53/40
[58] Field of Search.....................302/27, 39, 40, 62, 302/26

[56] References Cited

UNITED STATES PATENTS

| | | | |
|---|---|---|---|
| 522,458 | 7/1894 | Duckham | 302/62 |
| 1,935,843 | 11/1933 | Goebels | 302/39 |

Primary Examiner—Richard E. Aegerter
Assistant Examiner—Harold S. Lane
Attorney—Max R. Kraus

[57] ABSTRACT

A pneumatic conveying system and apparatus for transferring or conveying powdered or granular material from one place to another including, transporter means having a plurality of compartments whereby each of the compartments first receives the material and then compressed air is introduced to the filled compartment to convey, transfer and discharge the material from said compartment to the delivery or destination station. The operations are in timed relation and in a continuous cycle so that when one compartment is filling the other compartment will be discharging, thereby expediting the transfer of the material. Air speed control valves or metering devices are included for controlling the rate or speed of the exhausting or delivery of the material from the compartments.

14 Claims, 7 Drawing Figures

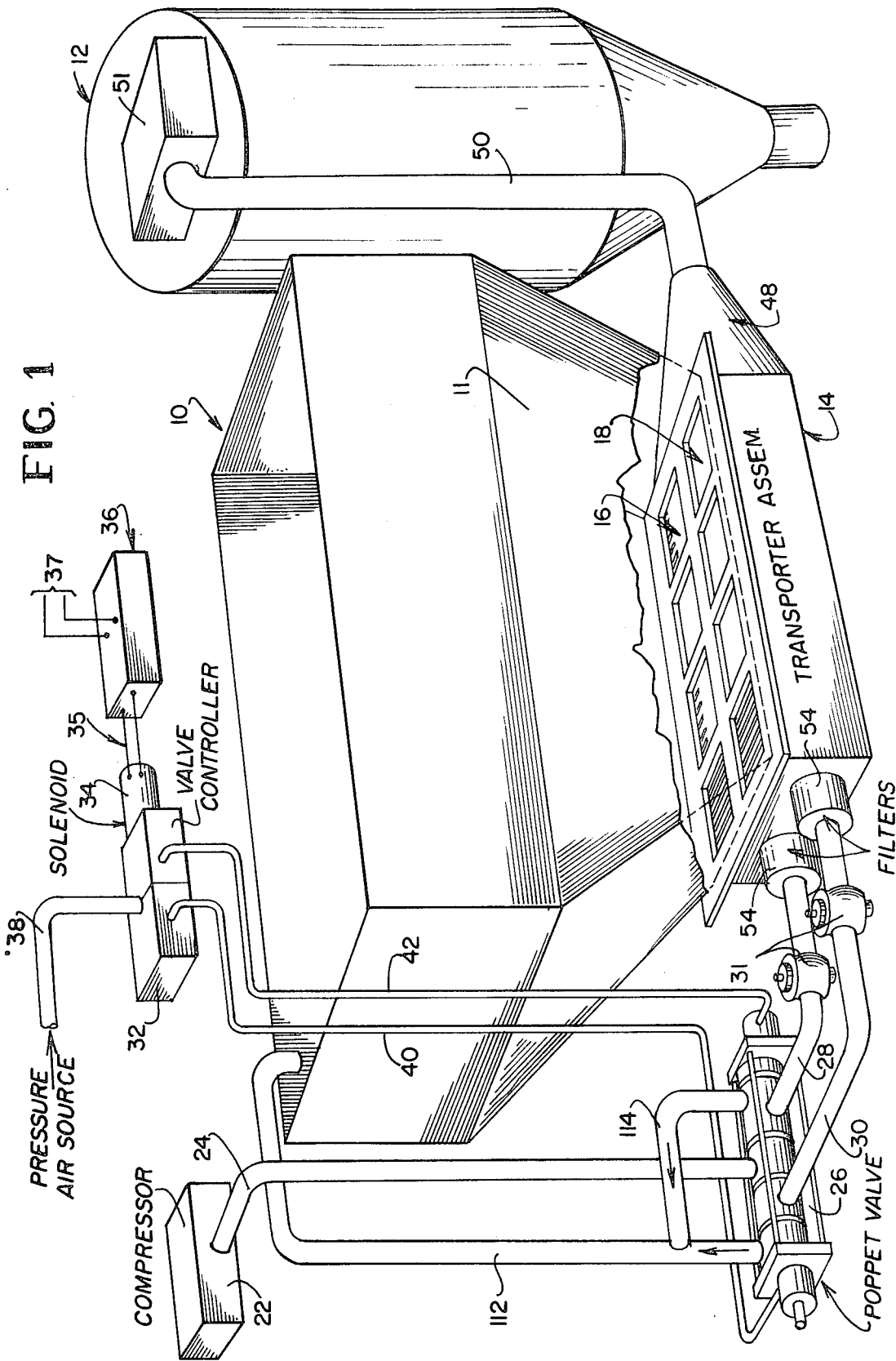

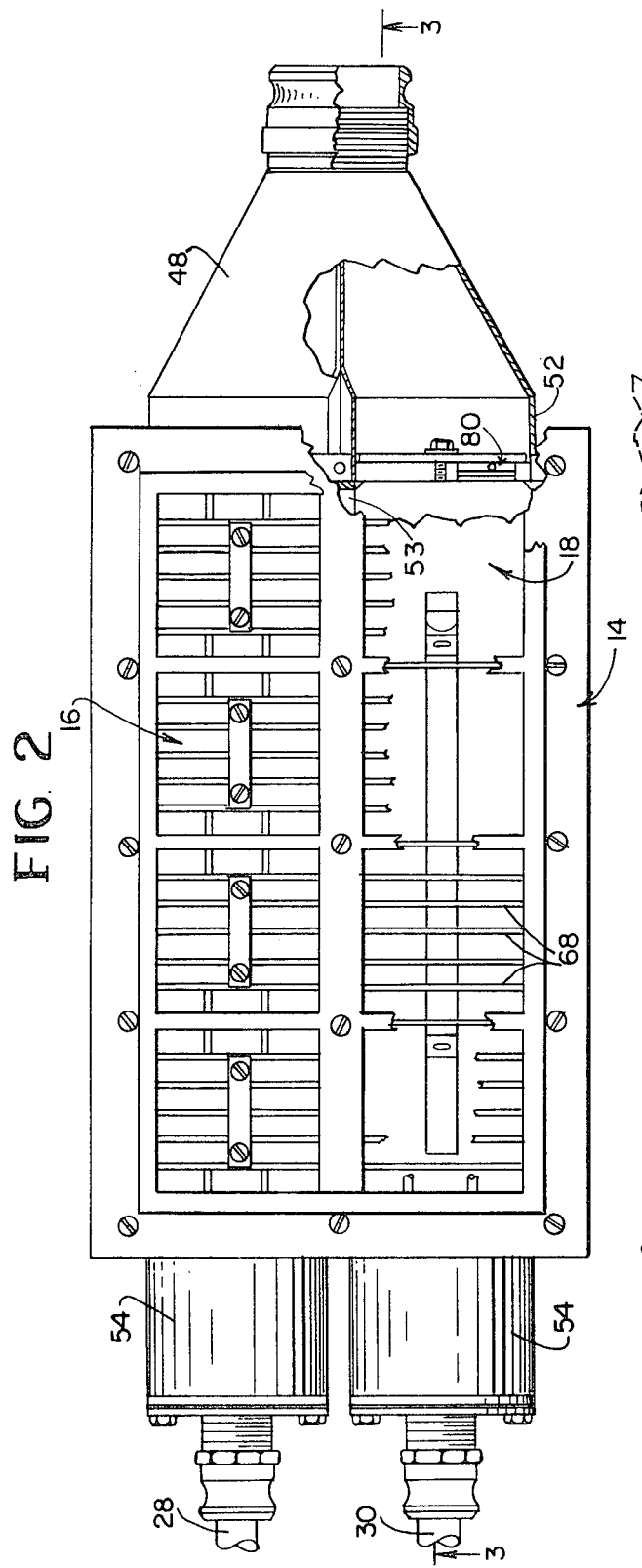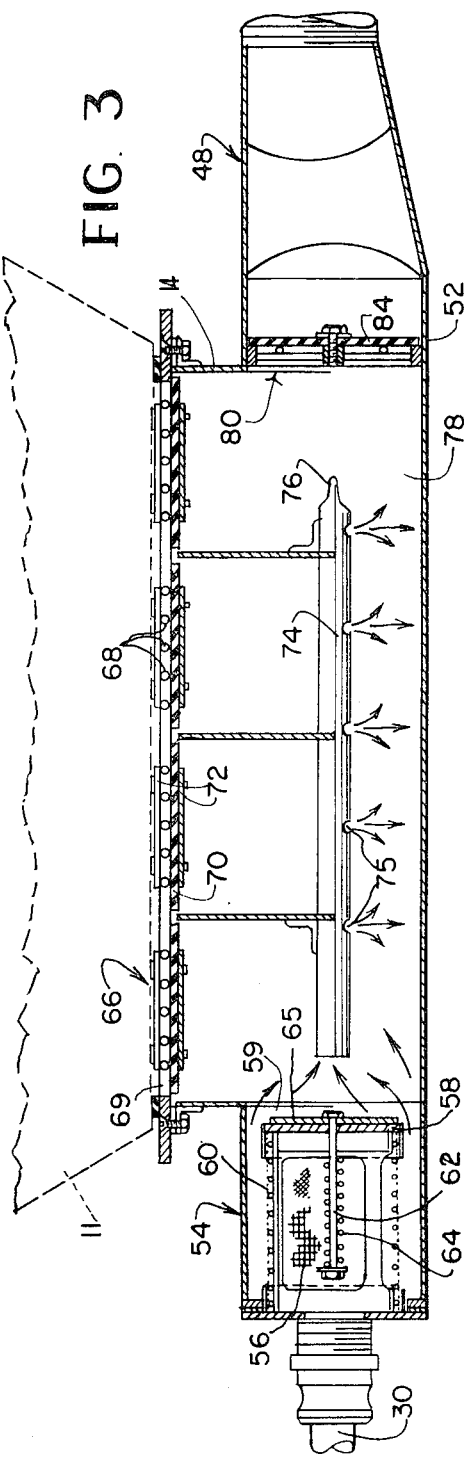

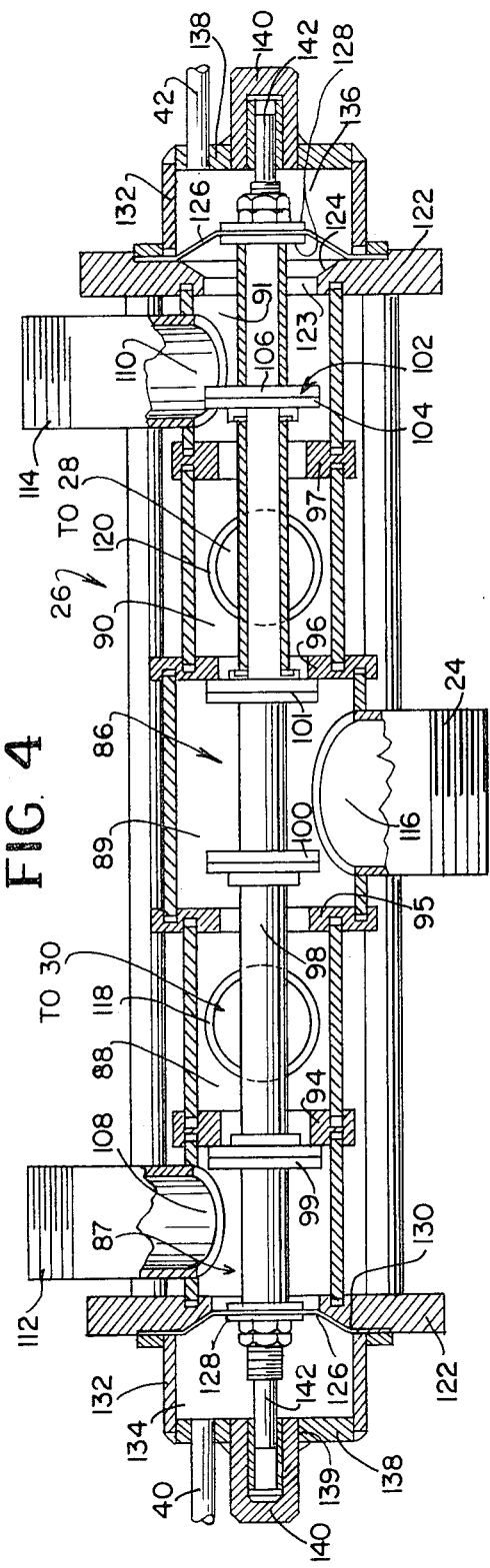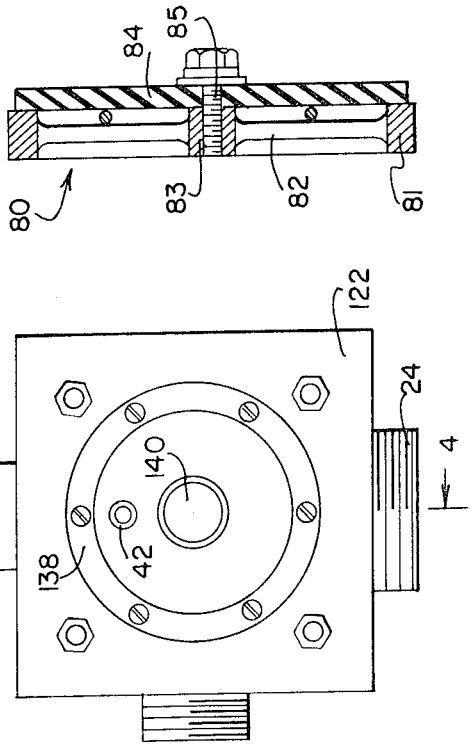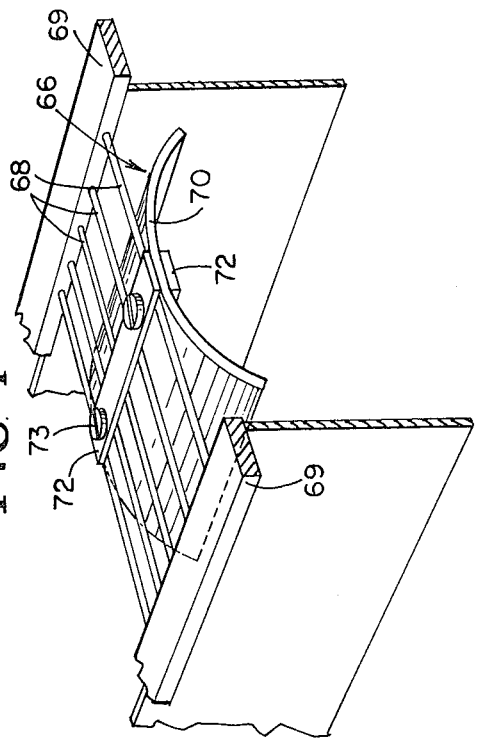

PNEUMATIC CONVEYING SYSTEM AND APPARATUS

BRIEF SUMMARY OF THE INVENTION

This invention is directed to a pneumatic conveying system and apparatus whereby powdered or granular material is penumatically conveyed and transferred from one place or transfer point to another place, such as from a railroad car, bin or the like, in which said material is carried or stored to a delivery or destination station such as another storage bin or the like which is removed or at a distance from the first place.

The system includes transporter means comprising a plurality of compartments or chambers and the means for introducing compressed air into said compartments alternately and successively, whereby when one chamber is being filled or loaded with the material the air pressure to said filling or loading chamber is blocked from entering that chamber, and during said filling operation the material already filled or loaded in the other chamber is being exhausted and transferred from said other chamber to a delivery or destination station. This alternating operation of transferring and conveying the material from the filled or loaded chamber while the other chamber is being filled or loaded is continuous and speeds up the transfer of material from one place to another. The system and apparatus also incorporates air speed control means or valves for metering the compressed air to the compartments of the transporter means whereby the rate or speed of the exhausting or delivery of the material from the compartments may be controlled to the extent desired.

BRIEF DESCRIPTION OF THE DRAWINGS

In the drawings:

FIG. 1 is a schematic of the system and apparatus forming this invention.

FIG. 2 is a top plan view, partly broken away, of the transporter unit.

FIG. 3 is a sectional view taken on line 3—3 of FIG. 2 of the transporter unit.

FIG. 4 is a sectional view of the poppet valve unit taken on line 4—4 of FIG. 5

FIG. 5 is an end view of the poppet valve unit.

FIG. 6 is a sectional view of the material outlet valve assembly used in the transporter unit, best shown in FIGS. 2 and 3, and FIG. 7 is a fragmentary perspective view of the inlet valve means of the transporter unit.

The broad outline of the schematic of the system and apparatus which is schematically illustrated in FIG. 1 will be described first, followed subsequently by the specific details of the various components.

The unloading bin generally indicated by the numeral 10 may comprise a railroad car or the like which contains the dry powdered or granular material which is to be transported by the system and apparatus of this invention to a receiving or storage bin or the like, generally indicated by the numeral 12, which is in a location removed from the bin 10.

The system and apparatus forming this invention which transports the material from the unloading bin 10 to the receiving bin 12 comprises a transporter unit generally indicated at 14 which is adapted to be positioned under or at the discharge end of the unloading bin 10. The transporter unit 14, the details of which are shown in FIGS. 2 and 3, and subsequently to be described, comprises a plurality of compartments or chambers generally indicated by the numerals 16 and 18. Both of said compartments are identical and they are operated so that they are alternately filling and discharging, for example, while the chamber or compartment 16 is receiving the material from the unloading bin 10 through the open inlet valves into said chamber, the other chamber or compartment 18 which had previously received the material will have its inlet valves closed and will be receiving the compressed air and will be discharging the material to the storage bin 12. At the conclusion of the discharge of the material from chamber 18, the inlet valve into chamber 16 will be closed and compressed air will be introduced into chamber 16 to discharge the material in said chamber. This cycle of operation is continuous so that as one chamber is receiving the material the other chamber is discharging the material previously received and the cycle continues in this alternate fashion.

Compressed air is the vehicle for conveying the material from the transport unit 14. The compressed air is formed by a compressor generally indicated by the numeral 22 which through a conduit 24 passes the compressed air to a poppet valve unit generally indicated at 26. The poppet valve unit, the details of which are best seen in FIG. 4, is also adapted to be operated by compressed air so as to feed the compressed air from conduit 24 alternately to the chambers 16 and 18 in the transporter unit 14. As shown schematically, the poppet valve unit 26 is connected by means of a conduit 28 to the chamber 16 of the transporter unit 14 and said poppet valve unit 26 is connected by another conduit 30 to the chamber 18 of the transporter unit. Thus, there is a timed sequence whereby the compressed air passes from the poppet valve unit 26 to chamber 16 of the transporter unit, while at the same time the compressed air is shut off from the other chamber 18. This operation of alternately introducing air into one chamber and then the other of the transporter unit is continuous so that while one chamber is loading with material the other chamber is unloading.

The means for operating the poppet valve unit for this alternating cycle includes a valve controller generally indicated by the numeral 32 which includes a solenoid 34 electrically connected at 35 to a timer 36, in turn electrically connected at 37 to a source of current supply. Conduit 38 connects the valve controller 32 to a standard plant compressor (not shown) which supplies approximately 80 – 100 p.s.i. to the valve controller 32.

The valve controller 32 is connected by a conduit 40 to one end of the poppet valve unit 26 and also by another conduit 42 to the opposite end of the poppet valve unit. As the compressed air is fed into the valve controller 32 through conduit 38, the timer 36 will operate the solenoid 34 to operate the valves in the valve controller to alternately feed compressed air into the conduits 40 and 42 to the poppet valve unit 26 for operating said poppet valve. The operation of the poppet valve unit will control the flow of the compressed air alternately to conduits 28 and 30 to the respective chambers 16 and 18 of the transporter unit 14.

The poppet valve unit has a pair of conduits 112 and 114 connected to it which are venting conduits, one from each of the opposite end sections of the poppet valve. These venting conduits will cause the exhaust to be vented to the top of the unloading bin 10 or to a dust collector. The outlet end 48 of the transporter unit 14 is connected by a conduit 50 which leads to and empties the transported material to the receiving bin 12.

The foregoing is a general description of the overall operation of the system and apparatus forming this invention. The specific details of the transporter unit 14 and the poppet valve unit 26 will now be described in the order mentioned.

Transporter Unit

The details of the transporter unit 14 are shown in FIGS. 2, 3, 6 and 7.

The transporter unit comprises a generally rectangular-shaped housing 52 which has a longitudinally extending central partition or wall 53 to divide the housing into the two separate chambers or compartments 16 and 18. Since the structure associated with each of these compartments 16 or 18 is identical, a description of one will suffice for both.

At the front of each of said compartments 16 or 18 there is a reduced housing 54 within which is contained the filter screen 56 and the filter valve 58. Said filter housing communicates as at 59 with the interior of the chamber 16 or 18, as best shown in FIG. 3. The filter screen 56 is suitably supported within the housing 54 and said filter screen is supported within a fiber housing 60 which supports the filter valve 58. The filter valve 58 is supported on a rod 62 which is spring biased by a spring 64 surrounding said rod to normally urge said filter valve 58 to closed position. A clamping plate 65 is positioned on the rod 62 adjacent the filter valve 58.

The conduits 28 and 30 from the poppet valve unit 26 are each connected to the respective housings 54, which housings each in turn are respectively connected to communicate with their respective chambers 16 or 18. As the compressed air enters the housing 54 from either conduits 28 or 30, it will pass through the filter housing 60 and will cause the filter valve 58 to open to permit passage of the compressed air into the respective chambers 16 and 18. Some of the compressed air will also, after it passes through the screen, pass around the exterior of the screen and into the chamber of the transporter unit. The filter valve 58 when closed also serves to prevent any back pressure in the chambers 16 and 18 and any material entrained in said back pressure from entering conduits 28 and 30.

Each of the conduits 28 and 30 is provided with an air speed control valve or metering valve generally designated by the numeral 31 which is manually adjusted to control or meter the amount of compressed air that is introduced to the compartments 16 and 18 of the transporter assembly 14. By manually adjusting the metering values 31 the exhausting or delivery of the material from the compartments 16 and 18 is controlled and regulated. For example, by reducing the amount of compressed air introduced into the compartments 16 and 18, the delivery or exhausting of the material from said compartments is slowed up, and conversely, by adjusting the air speed valves 31 to allow more compressed air to enter the compartments the exhausting and delivery of the material from the compartments is speeded up.

The top of each of the two chambers 16 and 18 in the transporter unit is provided with a plurality of material inlet valves generally designated by the numeral 66, the details of which are best shown in FIGS. 3 and 7. Extending transversely across the top of each of the chambers 16 and 18 are spaced rods 68, the opposite ends of which are anchored in supports 69 on the top of the housing of the transporter unit. Each of the inlet valves 66 is formed of a strip of rubber or like material 70 which is secured to the spaced rods 68 by a pair of spaced plates 72 connected by suitable fastening means 73, with the rubber strip sandwiched between. As shown in FIG. 7, the valve 66 is in open position, that is, when the valve is in the curved or arcuate position, the granular or powdered material from the unloading bin 10 will be passing into the chamber 16 or 18. This occurs when the compressed air is not being introduced into that chamber and the material in the unloading bin will by gravity force the inlet valve 66 to the shape shown in FIG. 7 to permit the material to flow into said compartment. When subsequently compressed air is introduced into said compartment the compressed air will cause the valve 66 to close and this will cause the strip 70 of the valve to assume its horizontal flat position, as shown in FIG. 3.

Extending across the top of each of the chambers or compartments 16 and 18 is a plurality of inlet valves 66, all of which operate in the aforedescribed manner. When the inlet valves 66 are closed by the compressed air entering the chamber for the purpose of exhausting the material in the chamber, the material from the unloading bin 10 cannot enter that chamber. All of the inlet valves 66 extending across the top of chamber 16 operate simultaneously, as do all of the inlet valves extending across the top of chamber 18. The lower or chute portion 11 of the unloading bin 10 is positioned directly over the top of the transporter unit so that the material from the bin will pass directly on to the top of the transporter unit 14.

Each chamber 16 or 18 is also provided with an aerating tube 74 which is suitably supported in a position elevated from the bottom of the chamber, as best shown in FIG. 3, and said aerating tube has outlets 75. The aerating tube or aerating means may be different from that shown. The front of the tube is open while the rear is closed as at 76. At the time air is introduced into a chamber, compressed air also enters the aerating tube and this serves to fluidize the material entering the chambers of the transporter unit.

The outlet end 78 of each of the chambers 16 and 18 is provided with an outlet valve generally designated by the numeral 80 and shown in detail in FIG. 6. The outlet valve is supported in a circular frame 81 having a radial spider 82, to the hub 83 of which is secured the valve disk 84 by suitable fastening means 85. The valve disk 84 is formed of a rubber or like material. As shown in FIG. 3, the outlet valve or valve disk is in closed position, however, when compressed air is introduced into the chamber the outlet 80 will be opened by the compressed air to permit the material in the chamber with the compressed air to pass said outlet valve and into the outlet end 48 at the rear of the transporter unit and through conduit 50 to the end receiver 51 which may comprise a box or the like with a baffle. The end receiver empties into the receiving or storage bin 12. Since each chamber 16 or 18 has at the outlet ends thereof an outlet valve 80, each of said outlet valves will operate independently of the other.

Poppet Valve Unit

The poppet valve unit generally designated by the numeral 26 which controls the alternate introduction of the compressed air into the respective chambers 16 and 18 of the transporter unit 14 is best seen in FIG. 4. The poppet valve unit 26 has a chamber 86 which is divided into five communicating sections identified by the numerals 87, 88, 89, 90 and 91. The sections are separated by spaced ring-like members, each of which defines a valve seat against which a valve member seats and unseats to open and close the sections, as will be more fully explained hereinafter. The valve seats are identified by the numerals 94, 95, 96 and 97.

The movable shaft which operates within the chamber 86 is generally designated by the numeral 98 and can be made up of sections suitably connected together with spaced valve members positioned thereon; said four valve members are generally designated by the numerals 99, 100, 101 and 102. Each of said valves is substantially alike and a description of one will suffice.

The valve comprises a rubber disk 104 positioned against a backing disk 106 suitably affixed to the shaft 98. The opposite end sections 87 and 91 have openings 108 and 110 to which are respectively connected the exhaust conduits 112 and 114. The central section 89 has an opening 116 to which is connected the conduit 24 from the compressor 22. Section 88 has an opening 118 connected to conduit 30 and section 90 has an opening 120 connected to conduit 28, both of said conduits connected to the transporter unit 14. The compressed air will enter the poppet valve chamber 86 through the central section 89 and will, dependent upon the open or closed position of the valves, pass into the adjacent sections of chamber 86 to the respective conduits 28 and 30 leading to the transporter unit 14.

At each of the opposite ends of chamber 86 is an end wall 122 having an opening 123 for passage of the longitudinal hollow shaft 98. Each of said end walls 122 has a tapering portion 124. A diaphragm 126 is secured to the shaft 98 between spaced diaphragm washers 128, with the outer circumferential portion of the diaphragm suitably secured as at 130 to the end walls 122. A housing section 132 is secured to each of the end walls 122 and extends laterally thereof. The housing sections 132 each define an end section. One end section is designated by the numeral 134 and the opposite end section is designated by the numeral 136. The opposite end sections 134 and 136 each have an end wall 138 with a central opening 139 which receives an end cap 140 to slidably accommodate the opposite ends 142 of the shaft 98. The shaft ends 142 are suitably affixed to the opposite ends of the shaft 98 and support the shaft for sliding movement. The end section 134 has an opening which is connected to the conduit 40 from the valve controller 32. The opposite end section 136 is connected through conduit 42 to the valve controller 32. The valve controller 32 is connected, as previously described, by conduit 38 to the compressor 22.

The compressed air from the plant compressor (not shown) is conducted through conduit 38 to the valve controller 32 which is operated by the solenoid 34 through the timer 36 to control the passage of the compressed air from the valve controller alternately to the conduits 40 and 42 to the poppet valve unit 26. For example, if the valve controller 32 is operated so that the compressed air passes through the valve controller through the conduit 40, the compressed air will enter the end section chamber 134 and force the diaphragm 126 to move to the right, as viewed in FIG. 4, so that it seats against the tapered wall portion 124 of the end wall 122, whereby moving the shaft 98 to the right so that the valve 99 will close the valve seat 94 to the end section 87. Simultaneously, the valve 100 will be moved to open the entrance into the section 88 so that the compressed air coming from conduit 24 into the central section 89 will pass into the section 88 adjacent the central section and through the opening 118 therein to conduit 30 to chamber 18 of the transporter unit 14. Simultaneously, the valve 101 will close entrance into the section 90 so that no compressed air will enter into said section. Thus, the compressed air will pass from conduit 24 through the central section 89 to the section 88 to conduit 30 to the transporter unit to introduce compressed air into the chamber 18 of the transporter unit and to cause the material in chamber 18 to be discharged, as previously described. The compressed air that enters the respective end sections 134 and 136 will when the shaft 98 is reversely shifted cause the trapped air therein to be discharged through the respective inlet conduits 40 and 42. For example, the air in end section 134 will pass out through conduit 40 when the shaft 98 is shifted from the position shown in FIG. 4 reversely (or back to its former position). The same is true of the trapped air in end section 136 which will pass out through conduit 42.

On the next cycle, as the timer 36 operates the solenoid 34, the valve controller 32 will direct the compressed air from conduit 38 to conduit 42, which air enters the opposite end chamber 136 and operates against the diaphragm 126 to cause it to move the shaft 98 to the left (FIG. 4). As the shaft 98 moves to the left the valve 106 will seat on valve seat 97 and close the opening into the end section 91 and the valve 101 will move away from the closed position against the valve seat 96, as shown in FIG. 4, so that it opens entrance into section 90 and the compressed air from the compressor will pass through conduit 24 into the central section 86 and to section 90 and through the opening 120 therein to conduit 28 leading to the chamber 16 of the transporter unit so that the air will be introduced into the transporter unit to expel or discharge the material therein, sad previously described. Thus, there is a timed relationship with the compressed air being introduced into the transporter unit alternately, allowing sufficient time during this alternate operation so that one chamber is being filled with the material while the other chamber is being discharged and then the cycle is repeated continuously.

The exhaust conduits 112 and 114 serve to exhaust the compressed air remaining in the respective sections 87 and 90 as the shaft 98 shifts back and forth to open and close the valves. For example, after valve 99 moves away from valve seat 94 to open the communication between sections 88 and 87, the compressed air remaining in section 88 will pass into section 87 and into exhaust conduit 112. Likewise, when valve 106 unseats from valve 97, the compressed air remaining in section 90 will pass into section 91 and into exhaust conduit 114. The exhaust conduits 112 and 114 exhaust to the top of unloading bin 10 or to a dust collector.

What is claimed is:

1. A system for pneumatically conveying powdered or granular material, said system including transporter means having a first compartment and a second compartment each in alternate manner adapted to receive the material and discharge the material in timed relation so that when the first compartment is receiving the material the second compartment previously filled with the material will be discharging same and when the first compartment is discharging the material the second compartment will be receiving the material, each of said compartments of the transporter having valve means for blocking and unblocking the flow of material to said compartment, said valve means being operated by the air pressure introduced into said compartment to close said valves as the air pressure entrains the material to discharge same from the compartment.

2. A system as set forth in claim 1 in which compressed air is introduced to the first and second compartments which entrains the material in said compartments and discharges and delivers the material from said compartments.

3. A system as set forth in claim 2 in which air speed control means controls the amount of air introduced to the first and second compartments to control the rate of discharge of the material from said compartments.

4. A system as set forth in claim 3 in which the air speed control means is manually adjustable.

5. A system as set forth in claim 1 including, a compressor and means for alternating the supply of compressed air to said first and second compartments, and means for blocking the entrance of the material into the compartment during the period that the compressed air is introduced into that compartment.

6. A system as set forth in claim 5 in which the means for controlling the alternate supplying of compressed air to said transporter means includes valve means operated by compressed air.

7. A system as set forth in claim 1 in which compressed air is introduced into the first and second compartments, with said compressed air entraining the material in the compartments to cause it to be discharged from the compartments.

8. A system as set forth in claim 7 which includes a poppet valve unit for controlling the flow of the compressed air to the transporter means.

9. A system as set forth in claim 8 in which a timer controls the operation of a valve controller which controls the flow of compressed air to the poppet valve unit for operating the poppet valve unit.

10. A system as set forth in claim 5 which includes poppet valve means for controlling the flow of the compressed air to the transporter means and in which a timer controls the operation of a valve controller which controls the flow of compressed air to the poppet valve means and in which compressed air from a source other than from the first mentioned compressor supplies compressed air to the valve controller.

11. A system as set forth in claim 1 in which the valves comprise a flexible strip extending across the top of the transporter means, which strip in the absence of air pressure in said compartment will by the flow of the material cause the strip to flex to an open position.

12. A system as set forth in claim 1 in which the compartments in the transporter means has aerating means.

13. A system for pneumatically conveying powdered or granular material from a source of material to a destination, said system including transporter means having a plurality of compartments, means for blocking and unblocking the entrance of material into said compartments, air pressure introduced into said compartments to entrain the material therein and discharge same therefrom, said blocking occurring when air pressure is introduced into the compartment for discharging the material therein, and said unblocking occurring when there is an absence of air pressure to said compartment.

14. A system as set forth in claim 13 in which the blocking and unblocking means comprise flexible members extending across the top of the compartments.

* * * * *